(12) United States Patent
Vredevoogd et al.

(10) Patent No.: US 6,469,621 B1
(45) Date of Patent: Oct. 22, 2002

(54) TIRE MONITOR COMPATIBLE WITH MULTIPLE DATA PROTOCOLS

(75) Inventors: Loren D. Vredevoogd, Holland, MI (US); Brian S. Honeck, Holland, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/931,456

(22) Filed: Aug. 16, 2001

(51) Int. Cl.$^7$ ............................................. B60C 23/00
(52) U.S. Cl. ........................ 340/445; 340/442; 340/447; 455/142; 455/143; 455/279.1
(58) Field of Search ................................ 340/445, 442, 340/446, 447, 448; 73/146.2, 146.5; 455/279.1, 142, 143

(56) References Cited

U.S. PATENT DOCUMENTS

| | | | |
|---|---|---|---|
| 5,461,385 A | 10/1995 | Armstrong | 342/42 |
| 5,473,938 A * | 12/1995 | Handfield et al. | 340/445 |
| 5,573,611 A | 11/1996 | Koch et al. | 152/152.1 |
| 5,900,808 A | 5/1999 | Lebo | 340/442 |
| 6,011,463 A | 1/2000 | Cormier, Sr. | 340/447 |
| 6,087,930 A * | 7/2000 | Kulka et al. | 200/61.22 |
| 6,256,358 B1 * | 7/2001 | Whikehart et al. | 329/315 |

* cited by examiner

Primary Examiner—Jeffery Hofsass
Assistant Examiner—Son Tang
(74) Attorney, Agent, or Firm—Foley & Lardner

(57) ABSTRACT

A tire monitor for monitoring a characteristic of tires on a vehicle includes a circuit configured to receive a first wireless signal having tire characteristic data and a first wireless protocol. The circuit is further configured to receive a second wireless signal having tire characteristic data and a second wireless protocol. The second wireless protocol is different than the first wireless protocol. The circuit is configured to monitor first tire data on the first wireless signal and second tire data on the second wireless signal.

32 Claims, 5 Drawing Sheets

TIRE MONITOR COMPATIBLE WITH MULTIPLE DATA PROTOCOLS

BACKGROUND OF THE DISCLOSURE

Increasing attention is being given to monitoring the pressure of tires on a vehicle while the vehicle is in motion. A typical wireless tire pressure monitoring (TPM) system includes a transmitter circuit coupled to each of a plurality of tires on a vehicle. Each transmitter circuit includes a tire pressure sensor inserted into a tire and a radio frequency transmitter. The transmitter circuits sense tire pressure and generate radio frequency signals. The tire pressure monitor system includes a tire pressure monitor comprising a receiver circuit for receiving and demodulating the radio frequency signals. The receiver circuit monitors the signals by, for example, reading the tire pressure data, displaying the tire pressures of each tire, providing a warning when a tire pressure is outside predetermined parameters, etc.

Recently, many companies are producing transmitter circuits for tire pressure monitoring systems, each with its own data protocol. Each data protocol includes different encoding patterns, modulation schemes, bit timing, etc. Therefore, an original equipment manufacturer must purchase a tire pressure monitor from the same company that sells the corresponding transmitter circuits, which is a disadvantage. Further, when replacing a tire on a Vehicle, the tire transmitter must be matched with the receiver, requiring the maintenance of a large database of information regarding which transmitters are compatible with which tire pressure monitors for which vehicles. Since new tires are replaced repeatedly throughout the life of the vehicle, this problem is compounded.

One prior system includes a tire air pressure monitoring and reporting system having a multiple frequency receiver display unit. The receiver display unit receives radio signals from wheel transmitters and, through the use of an internally mounted conventional scanning receiver, allows for the activation of tire indicator lights on the front of the display unit. The indicator lights indicate the abnormal status of each respective tire on the motor vehicle independently. One drawback of this receiver display unit is that it is not configured to receive messages having different protocols.

Accordingly, what is needed is an improved tire monitoring system and method for monitoring tire characteristics, such as tire pressure, temperature, etc. Further, what is needed is a tire monitoring system and method for receiving data messages having different protocols. Further still, what is needed is a tire pressure monitoring system and method for receiving and monitoring wireless radio frequency signals from a plurality of vehicle tires, wherein the tire pressure data is transmitted according to different wireless data protocols. The teachings hereinbelow extend to those embodiments which fall within the scope of the appended claims, regardless of whether they accomplish one or more of the above-mentioned needs.

SUMMARY OF EXEMPLARY EMBODIMENTS

According to an exemplary embodiment, a tire monitor for monitoring a characteristic of tires on a vehicle includes a circuit configured to receive a first wireless signal having tire characteristic data in a first wireless protocol. The circuit is further configured to receive a second wireless signal having tire characteristic data in a second wireless protocol. The second wireless protocol is different than the first wireless protocol. The circuit is further configured to monitor first tire data on the first wireless signal and second tire data on the second wireless signal.

According to another exemplary embodiment, a tire pressure monitor for monitoring tire pressure on a plurality of tires on a vehicle includes a receiver circuit and a control circuit. Each tire includes a wireless transmitter for transmitting tire pressure data wirelessly. At least one of the wireless transmitters utilizes a different wireless protocol than another of the wireless transmitters. The receiver circuit is configured to receive wireless signals from the plurality of tires. The control circuit is configured to receive the wireless signals from the receiver circuit, to identify the wireless protocols of the wireless signals and to monitor tire pressure data on the wireless signals.

According to yet another exemplary embodiment, a method of monitoring tire characteristics for a plurality of tires on a vehicle includes receiving tire characteristic data messages having different protocols and monitoring tire characteristic data on the tire characteristic data messages.

According to still another exemplary embodiment, a system for monitoring tire characteristics for a plurality of tires on a vehicle includes means for receiving tire characteristic data messages having different protocols, and means for monitoring tire characteristic data on the tire characteristic data messages.

BRIEF DESCRIPTION OF THE DRAWINGS

The invention will become more fully understood from the following detailed description, taken in conjunction with the accompanying drawings, wherein like reference numerals refer to like parts, and in which.

DETAILED DESCRIPTION OF EXEMPLARY EMBODIMENTS

Figure 1:
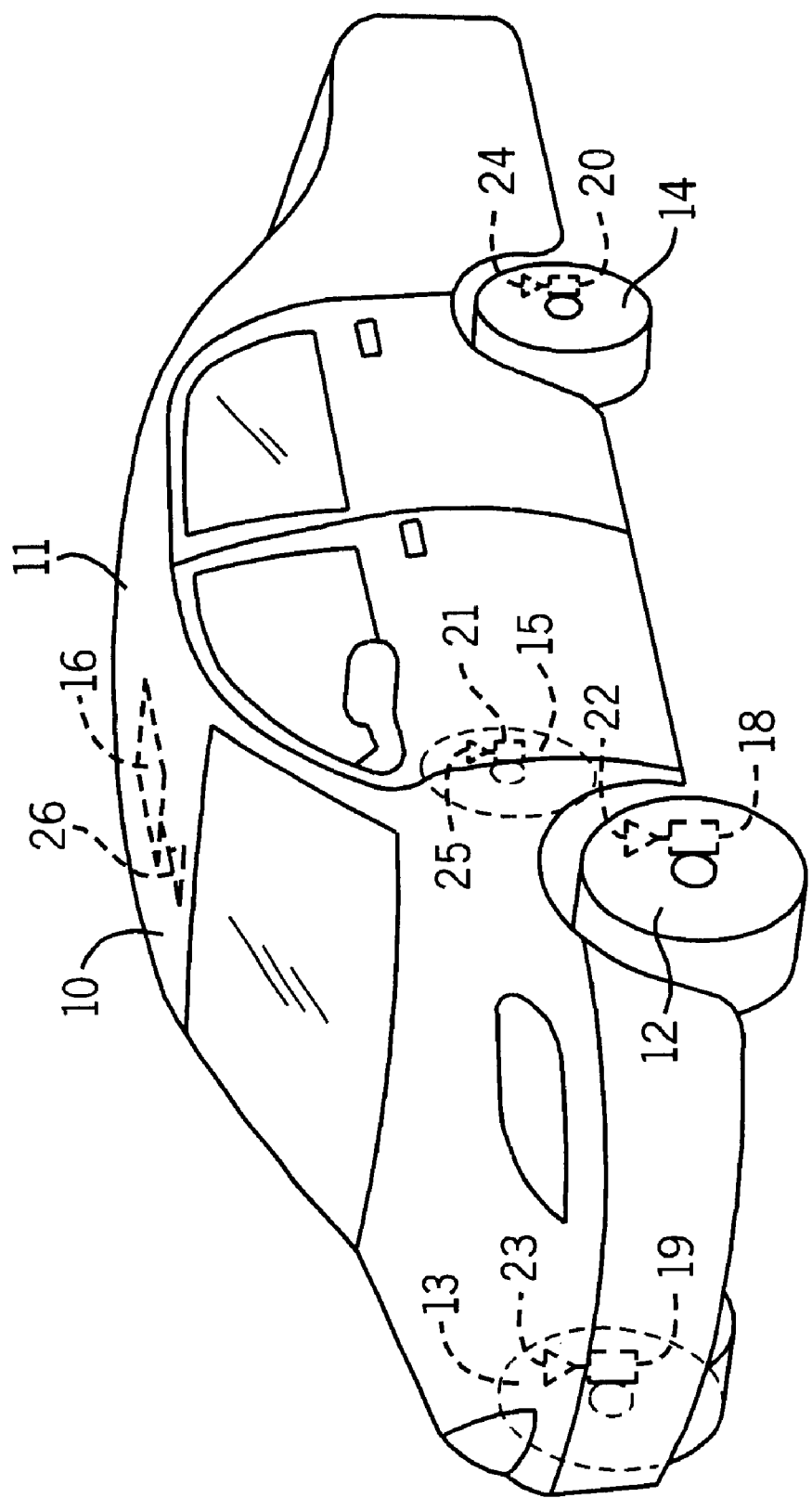
FIG. 1 is a perspective view of a vehicle having a tire monitor according to an exemplary embodiment.

Referring first to FIG. 1, a vehicle 10 is shown having a plurality of tires 12, 13, 14, 15 and a tire monitor 16. Vehicle 10 is an automobile in this exemplary embodiment, but may alternatively be a semi-truck, a construction vehicle, an all-terrain vehicle, a motorcycle, a trailer, or other vehicle. Vehicle 10 includes four tires in this embodiment, but may alternatively include greater or less than four tires (e.g., two tires, five tires, eighteen tires, etc.). Tires 12–15 are inflatable tires in this exemplary embodiment, and have various tire characteristics associated therewith, including tire pressures, temperatures, tread wear, alignment, etc.

Each of tires 12–15 has a tire sensor 18, 19, 20, 21 associated therewith. In this exemplary embodiment, tire sensors 18–21 are coupled to tires 12–15 and rotate therewith. Tire sensors 18–21 are configured to sense one or more tire characteristics of their respective tires 12–15. Tire sensors 18–21 may include control circuitry configured to monitor or analyze the tire characteristics which are sensed, or may alternatively include only sufficient circuitry to sense the tire characteristic or characteristics and provide them to output terminals 22, 23, 24, 25. In this exemplary embodiment, output terminals 22–25 are antennas or wires, but may alternatively be light-emitting diodes, or other wireless or wired output terminals configured to pass signals from tire sensors 18–21 to receiver terminal 26.

Receiver terminal 26 is a wireless receiver antenna in this exemplary embodiment (sometimes called a "detector"), which is configured to provide received signals to tire monitor 16. In this exemplary embodiment, one receiver terminal is provided. In an alternate embodiment, one receiver may be placed in the vicinity of each tire. Tire monitor 16 in the exemplary embodiment of FIG. 1 has one receiver terminal 26, preferably coupled to vehicle 10 in a location somewhat equidistant from each of the tires on vehicle 10, or equidistant from each of the output terminals associated with the tire sensors of each tire on vehicle 10. Receiver terminal 26 can be coupled to a vehicle headliner 11 (as shown in FIG. 1), or can alternatively be coupled to another vehicle interior element (e.g., the floor, the instrument panel, etc.) or vehicle exterior element (e.g., the frame, the suspension, etc.)

Figure 2:
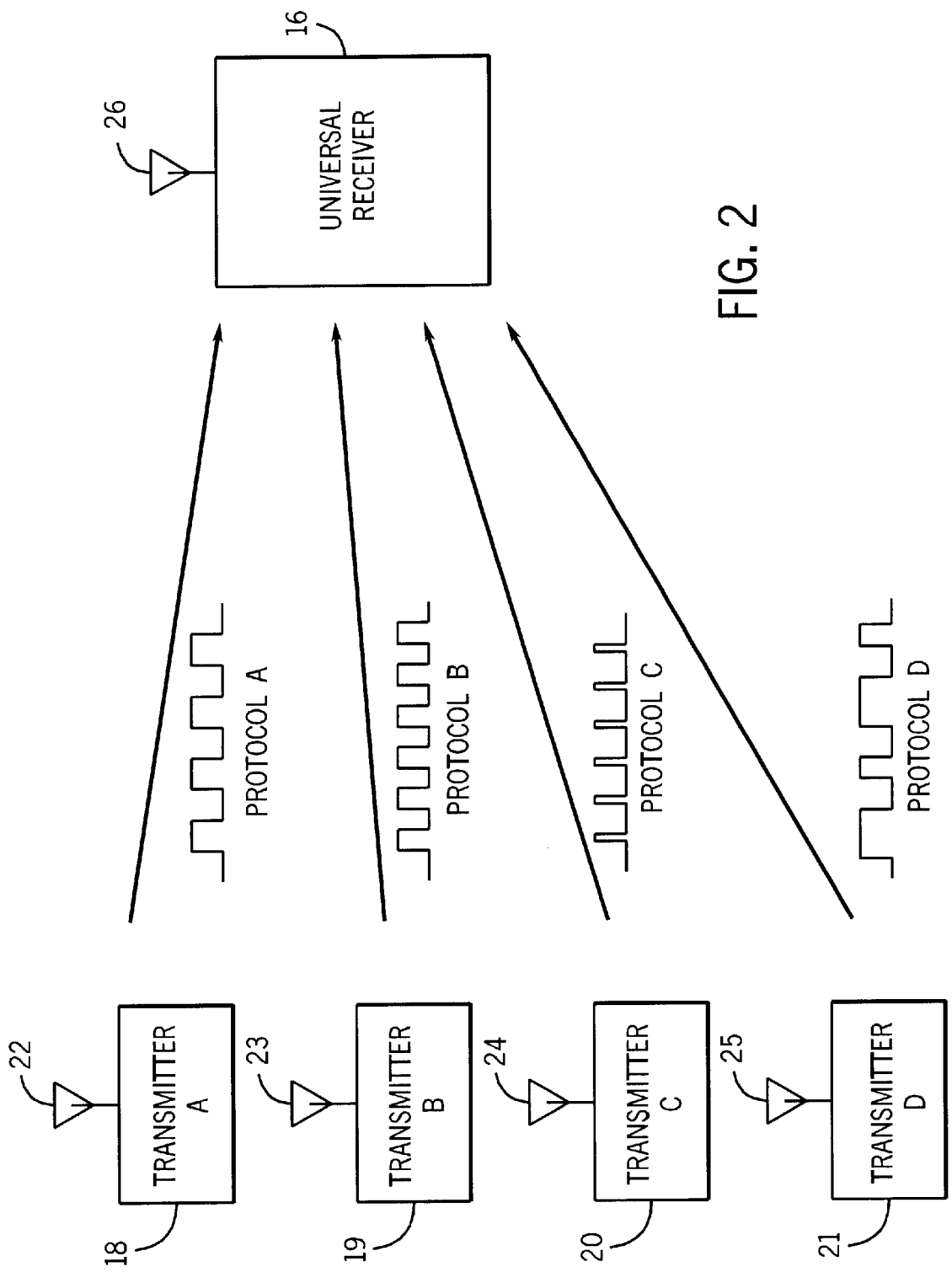
FIG. 2 is a data flow diagram illustrating wireless signals having different wireless protocols being transmitted from different transmitters to the tire monitor of FIG. 1, according to an exemplary embodiment.

Referring now to FIG. 2, one advantageous aspect of this exemplary embodiment is illustrated with reference to the flow diagram illustrated therein. Tire monitor 16 is a universal tire monitor which is compatible with multiple tire transmitter types, each tire transmitter type having a data protocol unique from the data protocols of the other transmitter types. FIG. 2 illustrates four tire sensors 18–21, each including a wireless transmitter for transmitting tire characteristic data (e.g., tire pressure, temperature, tread thickness, high and low tire pressure limits, etc.) wirelessly, and each utilizing a different wireless protocol to transmit tire characteristic data to tire monitor 16. Alternately, two or more of tire sensors 18–21 may use the same wireless protocol. The term "protocol" is defined as including modulation type (e.g., amplitude modulation, frequency modulation, phase modulation, etc.) and the definitions of a digital signal modulated on a carrier signal, which can include bit rate (also called symbol rate, bit frequency, bits per second, etc), bit encoding pattern (e.g., Manchester, Bi-Phase Manchester, etc.), definition of bits in a word (e.g., which bits are an identifier, which bits are the tire characteristic data, etc.), checksum algorithm, bit order (most significant bit or least significant bit transmitted first), synchronization bits (also called sync bits or start bits), etc. The term protocol, as used herein, does not refer to the carrier frequency used in the transmission.

As illustrated in FIG. 2, tire sensor 18 transmits tire characteristic data via a first wireless protocol (identified as Protocol A), tire sensor 19 transmits tire characteristic data in a second wireless protocol (identified as Protocol B), tire sensor 20 transmits tire characteristic data in a third wireless protocol (identified as Protocol C), and tire sensor 21 transmits tire characteristic data in a fourth wireless protocol. In an embodiment where one or more wired connections are utilized between tire sensors 18–21 and receive terminal 26, the data protocols may also be different for each of the tire sensors.

Advantageously, tire monitor 16 is configured to receive several wireless signals simultaneously or in succession, where each of the signals has a different wireless protocol. Different wireless protocols include any two protocols having at least one aspect of the protocol different (e.g., sync/start bit pattern, checksum algorithm, modulation type, etc.).

Tire monitor 16 is configured to monitor tire characteristic data on one or more of the wireless signals, for example, by reading the tire characteristic data from the wireless signals, by storing the tire characteristic data in a volatile or non-volatile memory, by recording a trend in the data, by forwarding the data to a display, by generating an audible or visual alarm in response to an alarm condition (e.g., tire pressure low), by transmitting the data over a vehicle bus, or by another monitoring function. In this embodiment, the wireless signals are provided in the radio frequency range, but may alternatively be provided in other ranges, such as the infrared signal range.

Figure 3:
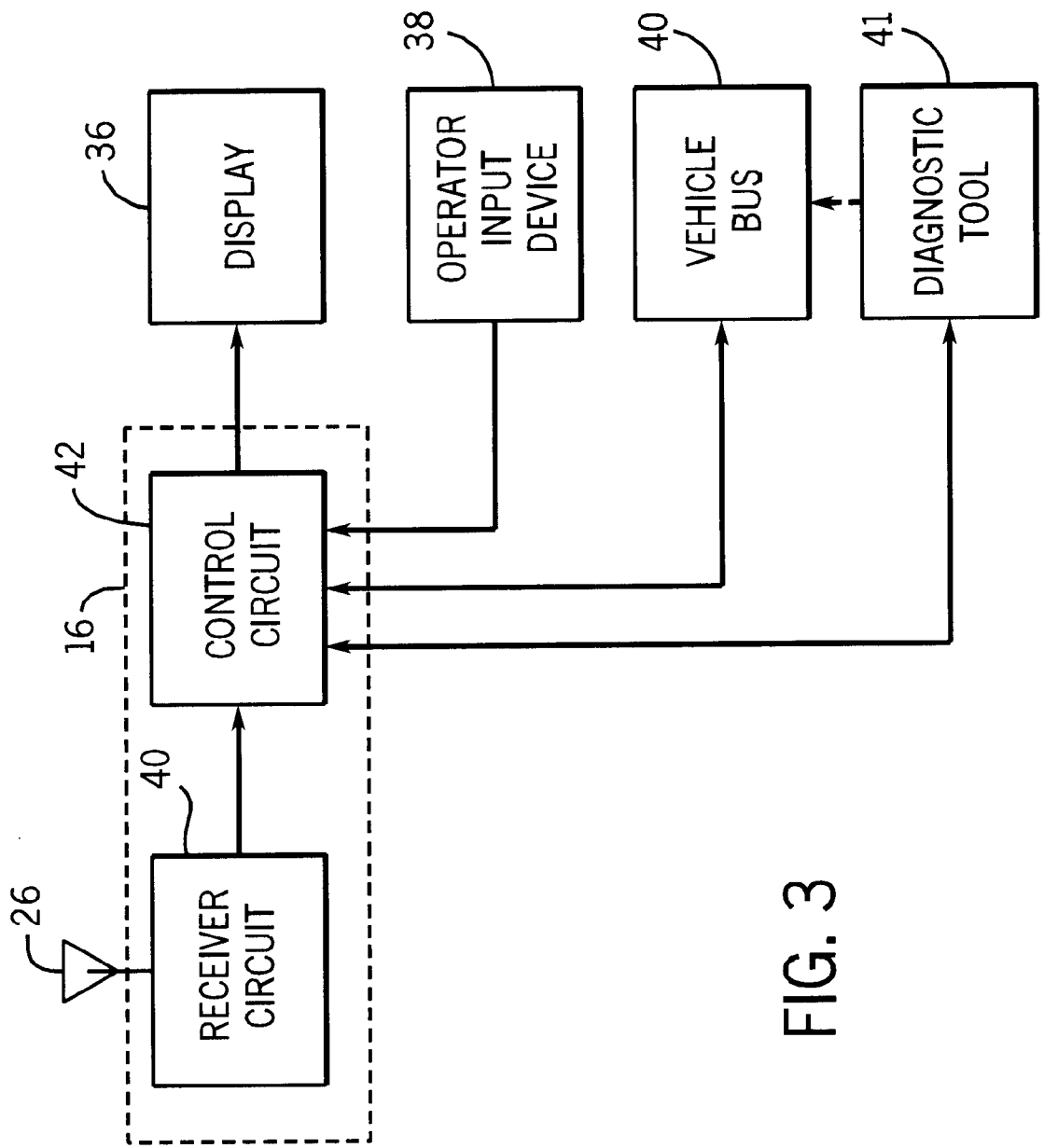
FIG. 3 is a block diagram of the tire monitor of FIG. 1, a display, an operator input device, a vehicle bus, and a diagnostic tool, according to an exemplary embodiment.

Referring now to FIG. 3, a block diagram of tire monitor 16 coupled to a display 36, an operator input device 38, a vehicle bus 40, and a diagnostic tool 41 is illustrated. Tire monitor 16 includes a receiver circuit 40 and a control circuit 42, which may comprise analog and/or digital components, and may be provided on a single integrated circuit (such as, an application-specific integrated circuit or system-on-chip), or may be provided on individual circuit boards, integrated circuits, or in other circuit configurations. Receiver circuit 40 is configured to receive wireless signals via receiver terminal 26, which is a radio frequency antenna in this embodiment. Receiver circuit 40 can include the necessary filtering, amplifying, demodulating, and other circuitry sufficient for receiving one or more wireless signals on receiver terminal 26 either simultaneously or in succession. Receiver circuit 40 is further configured to demodulate a digital data stream comprising tire characteristic data and to provide the tire characteristic data to control circuit 42.

In this exemplary embodiment, receiver circuit 40 is configured to receive amplitude-modulated signals at 433.92 MegaHertz (MHz). In an alternative embodiment, control circuit 42 can provide a control signal to receiver circuit 40 to control receiver circuit 40 according to a predetermined algorithm to receive signals at a selected carrier frequency and/or modulation type. For example, while a typical wireless signal may be provided at 433.92 MHz, some transmitters may provide signals at 315 MHz, or at other frequencies. Further, as described hereinbefore, the different protocols of the different wireless signals may include different modulation schemes. Receiver circuit 40 is configured to identify the proper carrier frequency and modulation scheme under the control of control circuit 42 via control input 44. Control circuit 42 and receive circuit 40 may utilize a voltage-controlled oscillation or phase-locked loop to control the selected receive frequency, or may use multiple receiver circuits, each tuned to a different receive frequency.

Control circuit 42 includes a microprocessor in this embodiment, such as a Microchip PIC 16 or Motorola processor, but may alternatively include a microcontroller, programmable logic, or other discrete analog or digital control circuitry. Control circuit 42 may include sufficient volatile and non-volatile memory to store a program therein and to store data as required to perform the functions set forth herein. Control circuit 42 is configured to receive tire characteristic data signals from receiver circuit 40 having different protocols and to monitor the tire characteristic data on the tire characteristic data signals. Control circuit 42 may further be configured to identify which tire characteristic data signal is associated with which of tires 12–15 on vehicle 10 (FIG. 1). Various algorithms now known or later developed may be implemented to perform the function of associating tire characteristic data signals with their respective tire locations on the vehicle (e.g., left front, right front, left rear, right rear, etc.).

Control circuit 42 may be configured to provide tire characteristic data to display 36. Display 36 may be mounted in the vehicle interior, such as in a headliner or instrument panel, and may include a liquid crystal display, a light-emitting diode display, or another display type. Under the control of control circuit 42, display 36 provides tire characteristic data to an operator of the vehicle for one or more of tires 12, 14, and may further provide alarms, either visual or audible, to the operator based on the tire characteristic data exceeding predetermined thresholds. For example, control circuit may be configured to provide a textual or graphical display indicating the tire location and pressure (e.g., "LF 30", "RF 28", etc.) and/or an indication that tire pressure is too low or too high (e.g., "LF LO", "RF HI", etc.).

Control circuit 42 can be coupled to a vehicle bus 40 and/or a diagnostic tool 41. Vehicle data and tire characteristic can be communicated between control circuit 42 and vehicle bus 40, between diagnostic tool 41 and vehicle bus 40, and/or between diagnostic tool 41 and control circuit 40.

Control circuit 42 may further receive operator input signals from operator input device 38, which may include a button, a voice recognition device, or another input device. In one embodiment, operator input device 38 may be used to select different tire characteristic data to be provided on display 38. In another embodiment, operator input device 38 may be used to enter a training mode during which control circuit 42 is trained to identify one or more wireless transmitters having different wireless protocols.

Figure 4:
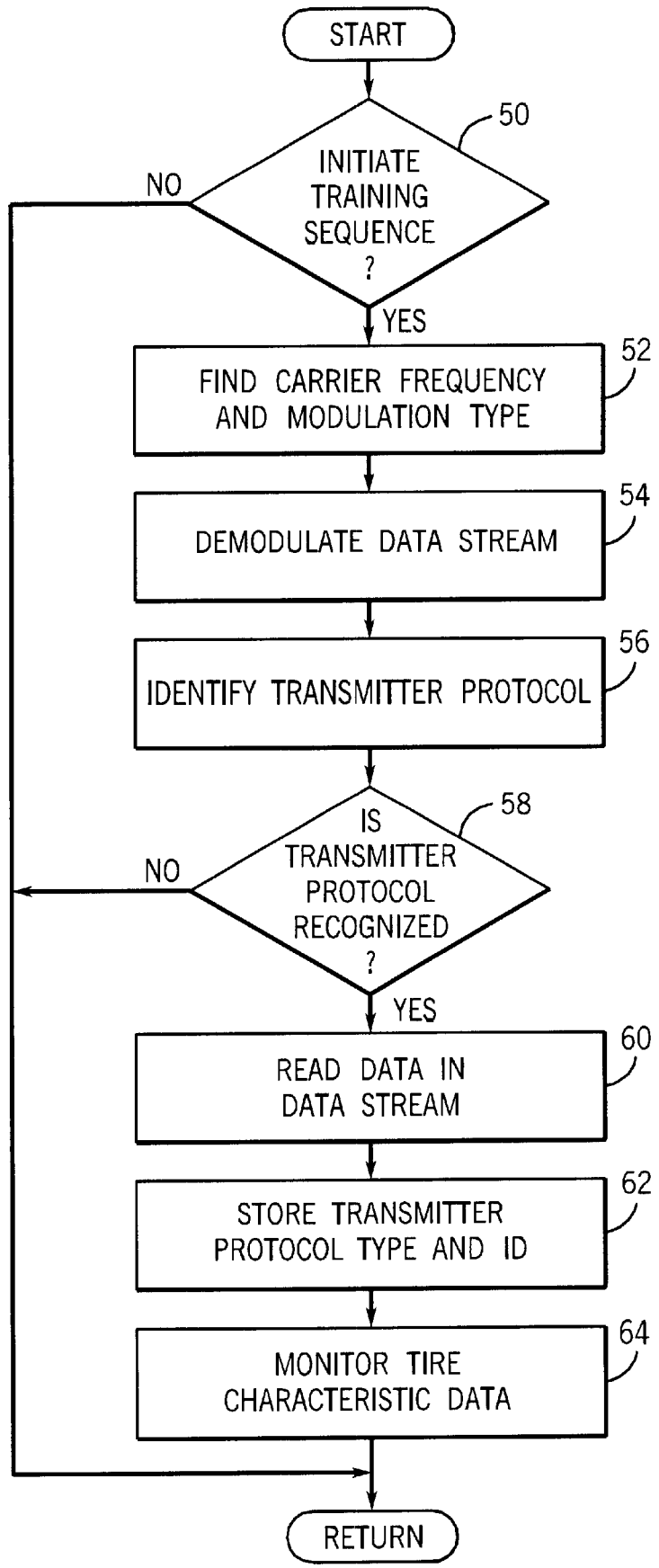
FIG. 4 is a flowchart illustrating steps in a training procedure according to an exemplary embodiment.

Referring now to FIG. 4, a training method for training tire monitor 16 to identify a tire identification (tire 10) and corresponding message protocol is disclosed. The training method begins at step 50 where it is determined whether the training procedure is to be initiated. The training method can be initiated by a manual operation (e.g., button press or signal received from diagnostic tool 41), an automatic operation (e.g., ignition ON, vehicle idle for more than a predetermined time period, no tire message received in a predetermined time period, or in response to other vehicle conditions). If the training sequence is initiated, the method proceeds to step 52 at which tire monitor 16 resolves or identifies the carrier frequency and modulation type of the wireless signal. If tire monitor 16 is configured to receive only one carrier frequency and modulation type, step 52 can be eliminated.

At step 54, the digital data stream in the received wireless signal is demodulated from the carrier frequency. At step 56, the protocol of the wireless signal is identified by reading a bit pattern (e.g., the start/sync bit pattern) that uniquely identifies the protocol. The bit pattern is then compared to one or more pre-stored or predetermined protocols to identify the protocol of the wireless signal. The pre-stored or predetermined protocols include sufficient data about the protocol to enable tire monitor 16 to read data from the wireless signal sent according to the protocol.

At step 58, if the transmitter protocol is not recognized (i.e., the bit pattern does not uniquely identify the protocol), tire monitor 16 will not be trained to monitor the wireless message. If the transmitter protocol is recognized, the tire data in the data stream is read at step 60. The tire data can include tire characteristic data and tire ID. At step 62, the transmitter protocol type is stored. The corresponding tire ID can also be stored. Advantageously, this training method enables tire monitor 16 to identify which protocols are used by the tires on the vehicle. This information can be used to assist tire monitor 16 in identifying the protocols of subsequently received wireless messages.

At step 64, tire characteristic data is monitored so that the most recent data about the tire can be provided to the vehicle operator.

According to one alternative embodiment, certain aspects of the wireless protocol can be input using operator input device 38 or diagnostic tool 41, to provide the necessary training. For example, additional protocols can be pre-stored in tire monitor 16, and the protocols of the existing transmitters on the vehicle can be input to tire monitor 16 to avoid the need for the training steps of the method of FIG. 4.

Figure 5:
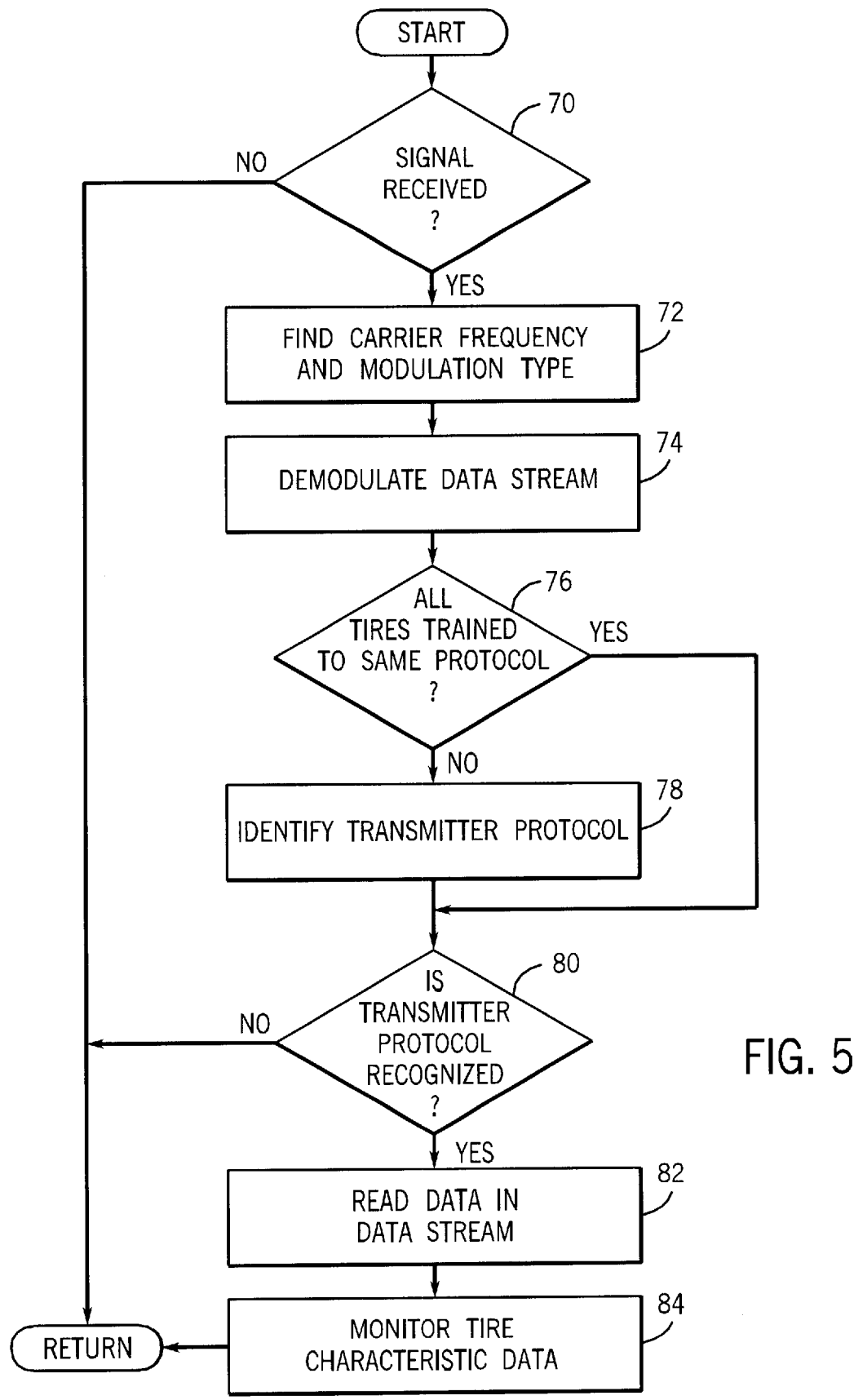
FIG. 5 is a flowchart of a method of monitoring tire characteristics for a plurality of tires on a vehicle, according to an exemplary embodiment.

Referring now to FIG. 5, a method of monitoring tire characteristic data for a plurality of tires on a vehicle is disclosed.

During an operation phase, at step 70, if a signal is received, tire monitor 16 identifies the carrier frequency and modulation type at step 72, in a similar manner to step 52. At step 74, the data stream is demodulated from the wireless signal, in a manner similar to step 54.

At step 76, tire monitor 16 uses the data learned during the training sequence to identify whether all tires on the vehicle are using the same transmitter protocol. If all tires are using the same transmitter protocol, tire monitor 16 proceeds to read the data from the data stream at step 80, in a manner similar to step 58 in the method of FIG. 4. If all tires are not using the same protocol, the method proceeds to step 78 to identify the transmitter protocol. At step 78, the protocol of the wireless signal is identified by comparing a bit pattern from the data stream to bit patterns of protocols which tire monitor 16 knows are associated with tires on the vehicle. Notably, at step 78, tire monitor 16 need not compare the bit pattern to all pre-stored or predetermined protocols, but rather can compare the bit pattern to a subset of the protocols including protocols that have been identified as being associated with the vehicle during training.

At step 80, if the transmitter protocol is recognized, the method proceeds to step 82 to read the data in the data stream in a manner similar to step 60 in FIG. 4. The method then proceeds to step 84 to monitor the tire characteristic data in a manner similar to step 64 in FIG. 4.

If the transmitter protocol is not recognized at step 80, this event may be an automatic triggering event to initiate a training sequence at step 50 in FIG. 4 so that tire monitor 16 can learn that a new tire is present.

Having thus described a specific embodiment of a training method in FIG. 4 and a monitoring method in FIG. 5, it will be understood by those of ordinary skill in the art that various modifications to these methods can be made. For example, a sleep mode may be utilized to conserve power. According to another alternative, at steps 56 and 78, any portion of the data stream may be used for comparison to pre-stored protocols. According to another alternative, the training method of FIG. 4 can be eliminated completely and tire monitor 16 can compare each new incoming wireless signal to all available pre-stored protocols. According to a further alternative, at step 62, the position or location of the tire on the vehicle (e.g., left front, right front,) may also be stored along with the tire I.D. and the protocol type.

An exemplary embodiment has been disclosed which allows a single tire monitor to receive tire characteristic data from tire sensors using different protocols and which may be manufactured by different manufacturers. Advantageously, a vehicle manufacturer may choose to mix and match tire sensors from different manufacturers on a vehicle to be manufactured and use the tire monitor disclosed herein to receive signals from all of the different sensors used. As a further advantage, since vehicle tires are frequently replaced during the life of a vehicle, the vehicle owner now may select from a number of different tire types having different transmitter types without interfering with the smooth operation of tire monitoring provided by the tire monitor disclosed herein.

While the exemplary embodiments illustrated in the FIGS. and described above are presently preferred, it should be understood that these embodiments are offered by way of example only. For example, various training and operation methods are contemplated including greater or less than the steps illustrated in the exemplary embodiments of FIGS. 4 and 5. Accordingly, the present invention is not limited to a particular embodiment, but extends to various modifications that nevertheless fall within the scope of the appended claims.

What is claimed is:

1. A tire monitor for monitoring a characteristic of tires on a vehicle, comprising a circuit configured to receive a first wireless signal having tire characteristic data in a first wireless protocol and a second wireless signal having tire characteristic data in a second wireless protocol, wherein the second wireless protocol is different than the first wireless protocol, the circuit configured to monitor first tire data on the first wireless signal and second tire data on the second wireless signal.

2. The tire monitor of claim 1, wherein the circuit includes a control circuit coupled to a receiver circuit, the receiver circuit configured to receive the first and second wireless signals and to provide the signals to the control circuit, the control circuit configured to monitor the first and second tire data.

3. The tire monitor of claim 2, wherein the first wireless protocol includes amplitude modulation and the second wireless protocol includes frequency modulation.

4. The tire monitor of claim 1, wherein the first and second wireless signals have frequencies in the radio frequency range.

5. The tire monitor of claim 2, wherein the first wireless protocol has a first encoding pattern and the second wireless protocol has a second encoding pattern.

6. The tire monitor of claim 1, wherein the first wireless protocol has a first bit length and the second wireless protocol has a second bit length.

7. The tire monitor of claim 1, wherein the tire characteristic is pressure and the first and second wireless signals include tire pressure data for first and second tires, respectively.

8. The tire monitor of claim 1, wherein the circuit is further configured to enter a training mode in which the circuit is configured to identify at least one of the first and second wireless protocols as a pre-stored protocol.

9. A tire pressure monitor for monitoring tire pressure on a plurality of tires on a vehicle, each tire including a wireless transmitter for transmitting tire pressure data wirelessly, wherein at least one of the wireless transmitters utilizes a different wireless protocol than another of the wireless transmitters, comprising:

a receiver circuit configured to receive wireless signals from the plurality of tires; and a control circuit configured to receive the wireless signals from the receiver circuit, to identify the wireless protocols of the wireless signals and to monitor tire pressure data on the wireless signals.

10. The tire pressure monitor of claim 9, wherein the receiver circuit is tuned to a single radio frequency.

11. The tire pressure monitor of claim 9, wherein the control circuit is configured to store a plurality of predetermined protocols and to identify the wireless protocols of the wireless signals by comparing the wireless signals to the predetermined protocols.

12. The tire pressure monitor of claim 9, wherein the receiver and control circuit are disposed on a single integrated circuit.

13. The tire pressure monitor of claim 9, wherein the control circuit is configured to generate display signals based on the monitored tire pressure data for display to a vehicle operator.

14. The tire pressure monitor of claim 9, wherein the control circuit is configured to provide an alarm indicator to the operator when the tire pressure for a tire crosses a predetermined threshold.

15. A method of monitoring tire characteristics for a plurality of tires on a vehicle, comprising the steps of:

receiving tire characteristic data signals having different protocols; and monitoring tire characteristic data on the tire characteristic data signals.

16. The method of claim 15, wherein the different protocols include different modulation schemes.

17. The method of claim 15, wherein the different protocols include different encoding patterns.

18. The method of claim 15, wherein the different protocols include different wake-up schemes.

19. The method of claim 15, wherein the step of receiving includes demodulating a tire characteristic data signal from a carrier frequency.

20. The method of claim 15, wherein the step of monitoring includes reading tire characteristic data from the tire characteristic data signals.

21. The method of claim 20, further comprising displaying the tire characteristic data for the vehicle operator.

22. The method of claim 15, wherein the tire characteristic data is tire pressure data.

23. The method of claim 15, wherein the tire characteristic data signals are wireless data signals.

24. The method of claim 23, wherein the tire characteristic data signals are in the radio frequency range.

25. The method of claim 15, further comprising training a tire monitor to receive the tire characteristic data having different protocols.

26. A system for monitoring tire characteristics for a plurality of tires on a vehicle, comprising:

means for receiving tire characteristic data signals having different protocols; and means for monitoring tire characteristic data on the tire characteristic data signals.

27. The system of claim 26, wherein the different protocols include different modulation schemes.

28. The system of claim 26, wherein the different protocols include different encoding patterns.

29. The system of claim 26, wherein the different protocols include different wake-up schemes.

30. The system of claim 26, wherein the means for receiving includes means for demodulating a tire characteristic data signal from a carrier frequency.

31. The system of claim 26, wherein the means for monitoring includes means for reading tire characteristic data from the tire characteristic data messages.

32. The system of claim 26, further comprising means for training the system to identify the different protocols of the tire characteristics data signals.

* * * * *